United States Patent [19]
Vallée et al.

[11] Patent Number: 5,608,733
[45] Date of Patent: Mar. 4, 1997

[54] ATM INVERSE MULTIPLEXING

[76] Inventors: Richard Vallée, 67 rue Castillou, Gatineau, Quebec, Canada, J8T 5Y4; John G. Ellis, 56 Rosenfeld Crescent, Kanata, Ontario, Canada, K2K 2H6

[21] Appl. No.: 350,092

[22] Filed: Nov. 29, 1994

[51] Int. Cl.⁶ .................................................. H04J 3/24
[52] U.S. Cl. .................................. 370/394; 370/395
[58] Field of Search .................... 370/94.2, 94.1, 370/60, 60.1, 16, 61, 16.1, 118, 85.13, 79; 371/8.1, 8.2, 11.1, 11.2; 340/827; 395/181; 379/221

[56] References Cited

U.S. PATENT DOCUMENTS

| 5,271,000 | 12/1993 | Engbersen et al. | 370/17 |
| 5,311,509 | 5/1994 | Heddes et al. | 370/94.1 |
| 5,392,280 | 2/1995 | Zheng | 370/94.2 |

FOREIGN PATENT DOCUMENTS

WO90/12467 10/1990 WIPO.
WO93/03568 2/1993 WIPO.
WO94/03005 2/1994 WIPO.

OTHER PUBLICATIONS

"ATM Inverse Multiplexing Mechanism", ATM Forum/94-0775, ATM Forum Technical Committee, Physical Sub-working Group, Strata-Com Inc., Sep. 26–29, 1994, pp. 1–30.

"Inverse Multiplexing of ATM Cells Over Low Speed UNI's Such As T1 and E1", ATM Forum/94-0956, Physical Layer Sub-working Group, Digital Link Corporation, Sep. 26–29 1994.

*Primary Examiner*—Douglas W. Olms
*Assistant Examiner*—Dang Ton

[57] ABSTRACT

In ATM networks, digital data in ATM cells are sent to a destination node over more than one transmission link in round robin fashion. This is called inverse multiplexing. At connection start-up, the source node informs the destination node of the specific round robin fashion of the transmission links so that the ATM cells are reassembled in a proper sequential order.

12 Claims, 6 Drawing Sheets

| Cell Purpose | Octet 1 | Octet 2 | Octet 3 | Octet 4 | Octet 5 |
|---|---|---|---|---|---|
| Idle cell identification | 00000000 | 00000000 | 00000000 | 00000001 | 01010010 |
| Cell-based interface F1 OAM cell | 00000000 | 00000000 | 00000000 | 00000011 | 01011100 |
| Cell-based interface F3 OAM cell | 00000000 | 00000000 | 00000000 | 00001001 | 01101000 |

*Fig 5*

| Octet 1 | Octet 2 | Octet 3 | Octet 4 | Octet 5 (HEC) |
|---|---|---|---|---|
| 00000000 | 00000000 | 00000000 | 00001111 | 11001011 |

*Fig 6*

| OCTET | ALLOCATION |
|---|---|
| 1 | AIM-RDI |
| 2 | AIMFERR |
| 3 | AIMCSN(MSB) |
| 4 | AIMCSN(LSB) |
| 5 | R |
| 6 | R |
| 7 | R |
| 8 | R |
| 9 | R |
| 10 | R |
| 11 | R |
| 12 | R |
| 13 | R |
| 14 | R |
| 15 | R |
| 16 | R |
| 17 | R |
| 18 | R |
| 19 | R |
| 20 | R |
| 21 | R |
| 22 | R |
| 23 | R |
| 45 | R |
| 46 | R |
| 47 | R |
| 48 | CEC (10) |

*FIG 7*

MSB: Most Significant Byte

LSB: Least Significant Byte

Fig 9

ATM INVERSE MULTIPLEXING

FIELD OF THE INVENTION

The invention relates to a new mechanism for sending ATM cells transparently over multiple slower transmission links. In particular, the invention is directed to a method of inverse multiplexing of a series of ATM cells transparently over N transmission links (N being a positive integer) of slower speed.

BACKGROUND OF THE INVENTION

It has been recognized that the T1/E1 rate (1.544/2.048 Mbit/s) is a cost effective way of user access to an ATM network as well as connection between ATM network switches. However, as ATM technology for wide area networks is deployed more and more, demands for transmission links of a rate higher than T1/E1 are increasing. Links of higher rates, such as T3/E3 (44.736/34.368 Mbit/s), have been designed to meet these needs. However, the cost of T3/E3 links is still prohibitive in many cases and the ratio of cost versus realistic utilization of the entire rate is not always attractive and fully justified for new ATM end users and service providers. ATM inverse multiplexers (AIMs) have been proposed to satisfy the need by using multiple T1/E1 links which are grouped collectively to provide the service at a higher rate.

Figure 1:
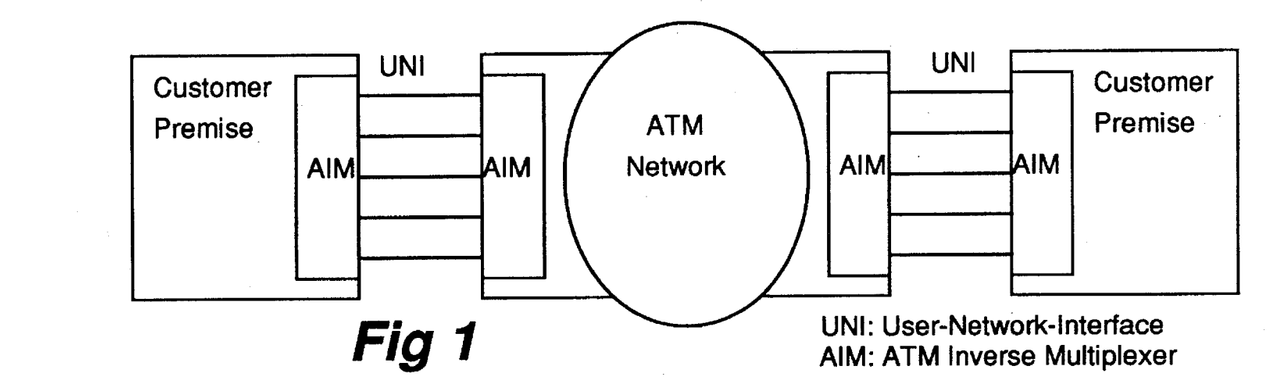
FIG. 1 shows a sample configuration involving AIM UNIs.
Figure 2:
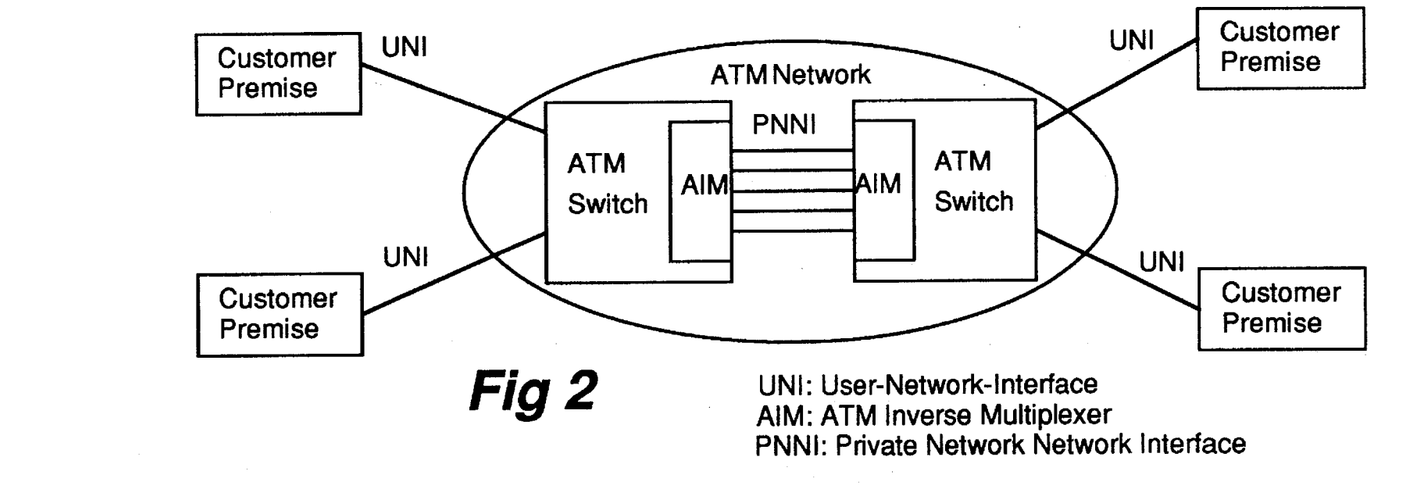
FIG. 2 shows a sample configuration involving AIM BICIs or PNNIs.

FIG. 1 and FIG. 2 show two sample configurations in which AIMs are used. FIG. 1 depicts a user access to a network through user network interfaces (UNIs) and FIG. 2 a link connection between ATM switches through broadband inter-carrier interfaces (BICIs) or private network to network interfaces (PNNIs).

Referring to the figures, the basic function of AIMs is to work in pairs to take an ATM cell stream coming from the ATM layer, send it over the multiple links by spreading cells over the available links and ensure that the initial cell stream can be retrieved at the far end. Thus the AIMs preferably make the ATM traffic transparent to the ATM layer over multiple links which connect them. As far as the ATM layer is concerned, it should only see a pipe whose rate is now the sum of the multiple link rates. It is assumed that each link is run in clear-mode without the presence of intermediate ATM nodes processing ATM cells. This means that there should be no cell discard by any intermediate transmission equipment.

Currently no ATM inverse multiplexing protocols have been proposed which can properly interwork existing ATM inverse multiplexers or other ATM products which are already available on the market, and yet are flexible enough to fit into the current standard ATM specifications. Two proposals for an ATM inverse multiplexing protocol have so far been made and are described in detail below.

New Transmission Convergence Protocol Using GFC Bits

Figure 3:
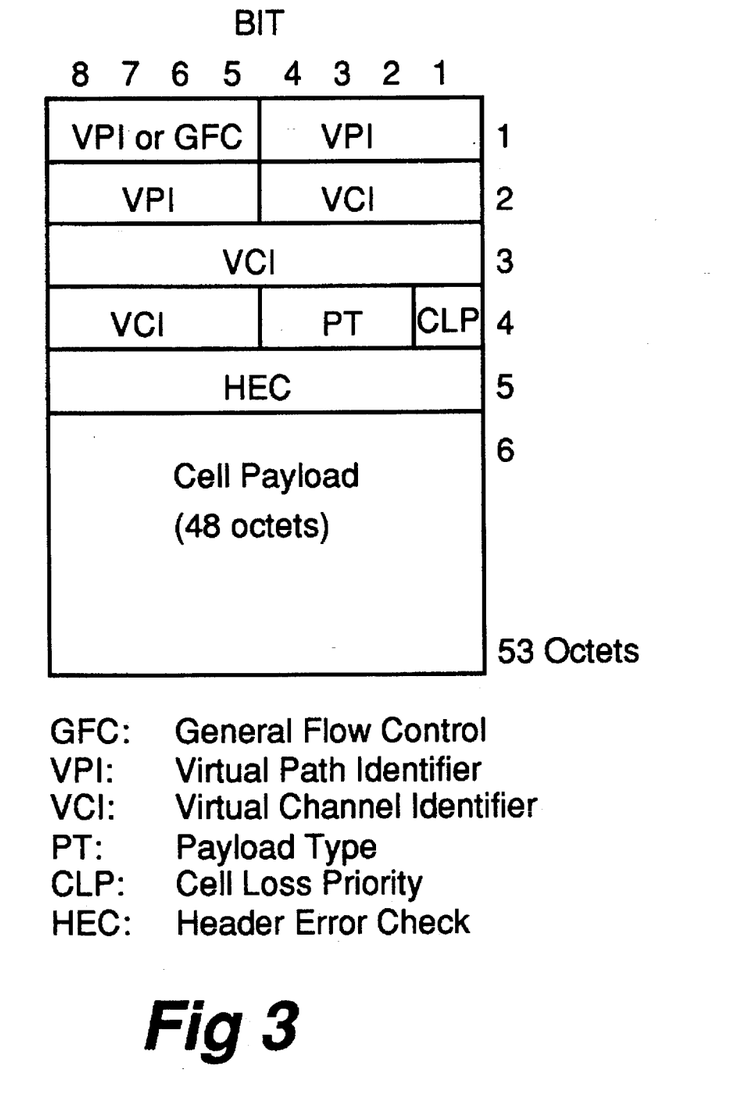
FIG. 3 depicts the ATM cell structure defined in the ITU Recommendation.

This protocol was presented in "Physical Layer Sub-Working Group ATM Forum/94-0775, ATM Inverse Multiplexing Mechanism", September 1994, by StrataCom Inc. The protocol robs two of the Generic Flow Control (GFC) bits contained in each cell transmitted over the multiple T1/E1 links to implement a new transmission convergence (TC) layer. FIG. 3 shows the ATM cell structure which is defined in the ITU Recommendation. The TC layer is defined by one GFC bit for framing and the other one for link control. The framing bit is used to determine relative link delays while the link control bit is used for communication, control and administration between two TC points at two ends of the inverse multiplexer.

In order to establish the sequence of cells over the links in a round robin manner, one end is defined as being "master" and the other as "slave". The "master" decides and informs the slave about the multiple link configuration using the control channel implemented through the link control bits.

This protocol is only applicable, however, for UNI application points because GFC bits that are robbed to implement the TC layer are only present in a cell defined for UNI. For NNI cells, the corresponding bits are no longer available since they are captured under the VPI field. Service providers are interested in ATM inverse multiplexers for carrying ATM traffic at rates higher than T1/E1 and lower than T3/E3, but this protocol will not satisfy their need. It should also be noted that the protocol calls for a need to identify a "master" and a "slave" TC point and that requires an additional setting to be performed by the network operator.

Bit Pipe Inverse Multiplexing

This protocol was presented in "Physical Layer Sub-Working Group ATM Forum/94-0956, Inverse Multiplexing of ATM cells over low speed UNIs such as T1 and E1", September 1994, by Digital Link Corporation. It proposes a "bit pipe" inverse multiplexing technique requiring the definition of a "bonding" (bandwidth on demand) like specification for N (positive number) T1/E1 inverse multiplexing.

It is not clear in the proposal how both ends of the links exchange information concerning the order of cells to be transferred from one end to another over multiple links. The proposal mentions the existence and deployment of physical layer protocols that perform inverse multiplexing. The inverse multiplexer which can be used in this proposal is presumably the one defined by Digital Link Corporation in their "DL3800 DS1 Inverse Multiplexer Users Manual, 1993".

The inverse multiplexing protocol defined in the above user's manual relies on the definition of an extra bit taken from T1/E1 payload bits to configure the multiple links and adjust differential link delays. This protocol introduces the need for extra processing of data between devices dealing with T1/E1 frames and ATM cell delineation. It also causes the ATM cells to no longer be byte aligned with the DS1/E1 frame. This is a requirement by the ATM Forum UNI DS1/E1 Physical Layer specifications. Changes like this would not be welcome by end users, vendors and service providers who are already using and deploying ATM equipment.

OBJECTS OF THE INVENTION

It is therefore an object of the invention to provide a method of sending ATM traffic over a connection consisting of a plurality of transmission links.

It is another object of the invention to provide a method of sending a series of ATM cells spread over a plurality of transmission links in a specific round robin order.

It is yet another object of the invention to provide a method of sending ATM cells containing sequence numbers therein over a plurality of transmission links in a specific round robin order.

It is a further object of the invention to provide a method of sending a series of ATM cells between ATM inverse multiplexers over a connection consisting of a plurality of transmission links, transparent to the ATM layer.

It is yet another object of the invention to provide a method of sending ATM traffic over a connection which consists of a plurality of transmission links and has been reconfigured after the connection start-up.

It is still another object of the invention to provide an ATM inverse multiplexing method which is applicable to UNIs, BICIs and PNNs.

It is a further object of the invention to provide a method of preserving link integrity by periodically sending sequence number cells.

It is a further object of the invention to provide a method of handling link failure and link reconfiguration.

SUMMARY OF THE INVENTION

Briefly stated, according to one aspect the invention is directed to a method of sending digital data from a source node to a destination node over a connection consisting of a plurality of transmission links, the digital data containing a series of ATM data cells. The method comprises steps of the source node informing the destination node, at the connection start-up by way of ATM SN cells, of a specific round robin order in which the series of ATM data cells are to be transmitted over the connection, and sending each ATM data cell in the series to the destination node in the round robin order.

According to a further aspect of the invention, the method comprises a further step of the source node sending ATM SN cells whose sequence number field is set to indicate the specific round robin order.

According to yet another aspect, the invention comprises repeating the steps which have been performed at the connection start-up, wherever the connection is to be reconfigured.

According to still another aspect, the invention comprises a step of a node informing another node of a link failure and repeating the steps which have been performed at the connection start-up, wherever the connection is to be reconfigured.

BRIEF DESCRIPTION OF THE DRAWINGS

For a more complete understanding of the invention and for further objects and advantages thereof, reference may now be made to the following description, taken in conjunction with the accompanying drawings, in which.

DETAILED DESCRIPTION OF PREFERRED EMBODIMENTS

There are requirements that have to be considered when defining a new ATM inverse multiplexing protocol. These requirements are:

It must multiplex and demultiplex an ATM cell stream distributed in a round robin manner over multiple links such as T1/E1 links.

It must adjust up to 32 milliseconds of differential link delays between individual links in a case where T1/E1 links are used.

It must reconfigure multiple links in the event that a link has to be added, deleted or is considered inadequate to provide service.

It must be defined for not only UNIs but also for PNNIs and BICIs.

It must be transparent to the devices handling the convergence of ATM cells into the PDH signal.

It must be transparent to the devices dealing with ATM layer cells.

The present invention achieves all of the above requirements and solves the problems discussed earlier. The invention relates to a new ATM inverse multiplexing scheme that makes use of a physical layer operation administration and maintenance (OAM) cell which has been properly defined. This OAM cell is defined to contain valuable information to allow proper operation of the ATM inverse multiplexing mechanism and also to provide opportunity for handling a link failure situation.

The newly defined OAM cell is called an AIM OAM cell or AIM Sequence Number (SN) cell and is mainly designed to carry a cell sequence number and a feedback link status field. The sequence number in the SN cell is made available for the receiver end for recovering the initial cell stream from the incoming links. The feedback link status is made available for the receiver to inform the transmitter, by sending its own SN cells, that it is receiving cells and it is also an integral part of the same round robin mechanism, that is to say, the feedback link status value SN cells in either direction must agree with each other, although the sequence numbers at both ends may be different. When the receiver sends its own SN cells in response to the transmitter that it is receiving cells, it is in fact acknowledging that the receiver is ready to receive subsequent ATM data cells.

Figure 4:
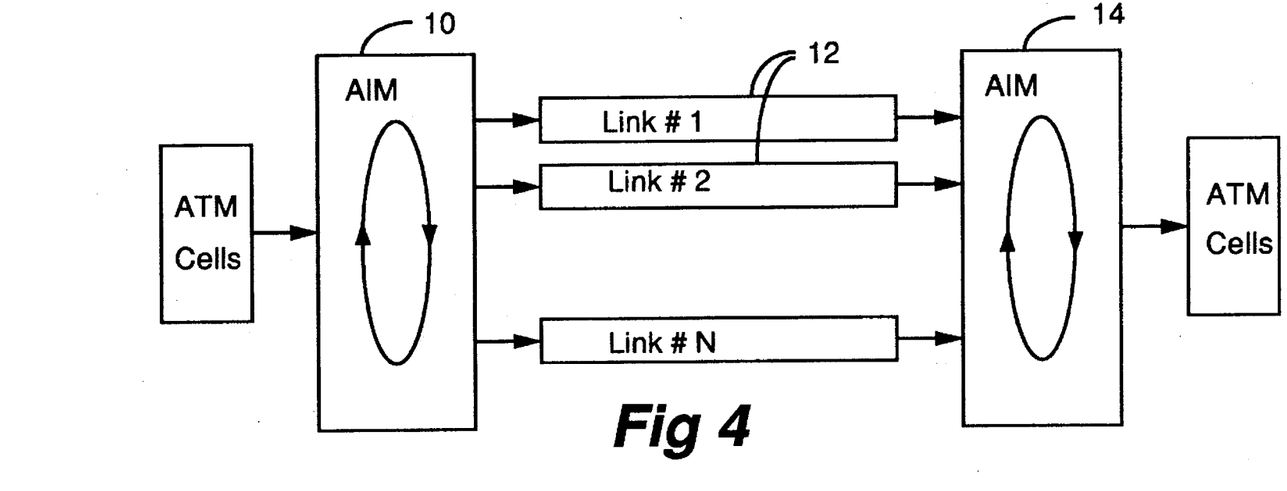
FIG. 4 is a schematic illustration of multiplexing and demultiplexing of ATM cells over AIMs and links.

FIG. 4 shows how the ATM cells are multiplexed and then demultiplexed over AIMs in one direction. At the transmitting node, an AIM 10 takes a series of ATM cells from an ATM layer device. It spreads ATM cells and transmits each cell over each of N transmission links, N being a positive integer. The order of transmission is in round robin fashion. This process is called an inverse multiplexing. At the receiving node, cells from N links are inverse demultiplexed (assembled) and sent to an ATM layer device by an AIM 14. The same order must be employed at this node to recover a proper sequence of cells. Both nodes must be aware of the round robin order which is to be employed. Upon initialization, therefore, both AIMs send a series of SN cells in round robin fashion over the links, e.g. T1/E1 links. This allows the receiver AIM at both nodes to establish the sequence in which to read cells from the incoming links as well as to adjust relative link delay.

As mentioned above, the SN cell also carries an extra field used by each T1/E1 link to indicate that both AIMs belong to the same link round robin. This information can then be used locally to determine if at the corresponding local node a link should be added, removed or maintained in the round robin.

When a change of link configuration occurs by a link being added, removed or declared as being down, each node sends a series of SN cells to allow the far-end node to reestablish the sequence of cells to read from the incoming links.

Figure 5:
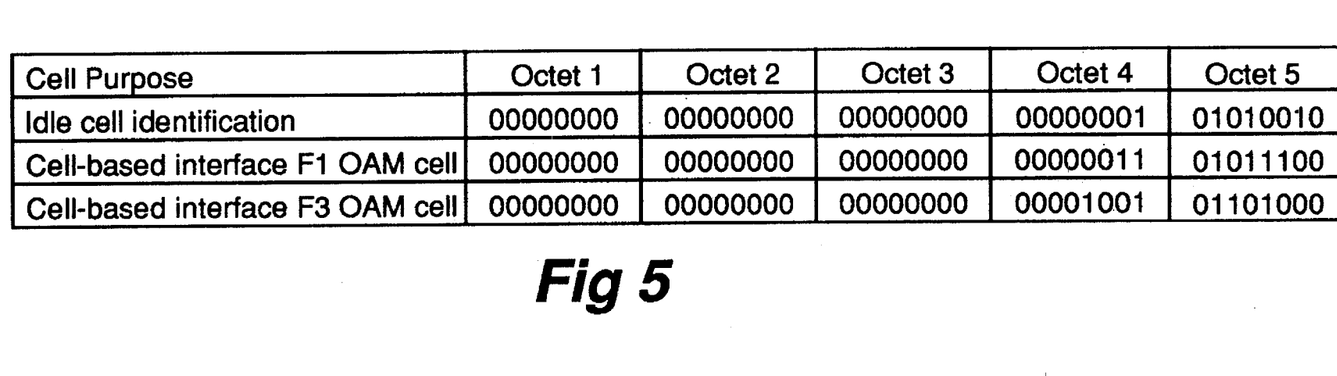
FIG. 5 shows preassigned cell header values for use by the physical layer.

The protocol of the invention calls for a physical layer OAM cell that is defined to be exclusively processed by the ATM inverse multiplexers. The new cell structure has to be consistent with the cell structure defined in ITU Recommendation I.361. FIG. 3 shows that structure of UNI/NNI ATM cells that is defined in I.361. ITU Recommendations I.361 and I.432 state that ATM cells consisting of a header whose VPI and VCI fields are set to zero are reserved for use by the physical layer. So far three preassigned values of the cell header are reserved for use by the physical layer. They are shown in FIG. 5.

Figure 6:
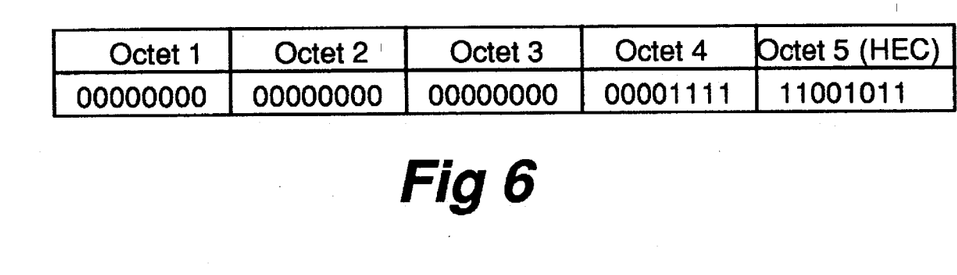
FIG. 6 shows a header pattern of an AIM OAM cell, according to one embodiment of the invention.

The physical layer OAM cell according to one embodiment of the invention is then defined by using a non-assigned value by setting the PT field to "111". This is shown in FIG. 6.

Figure 7:
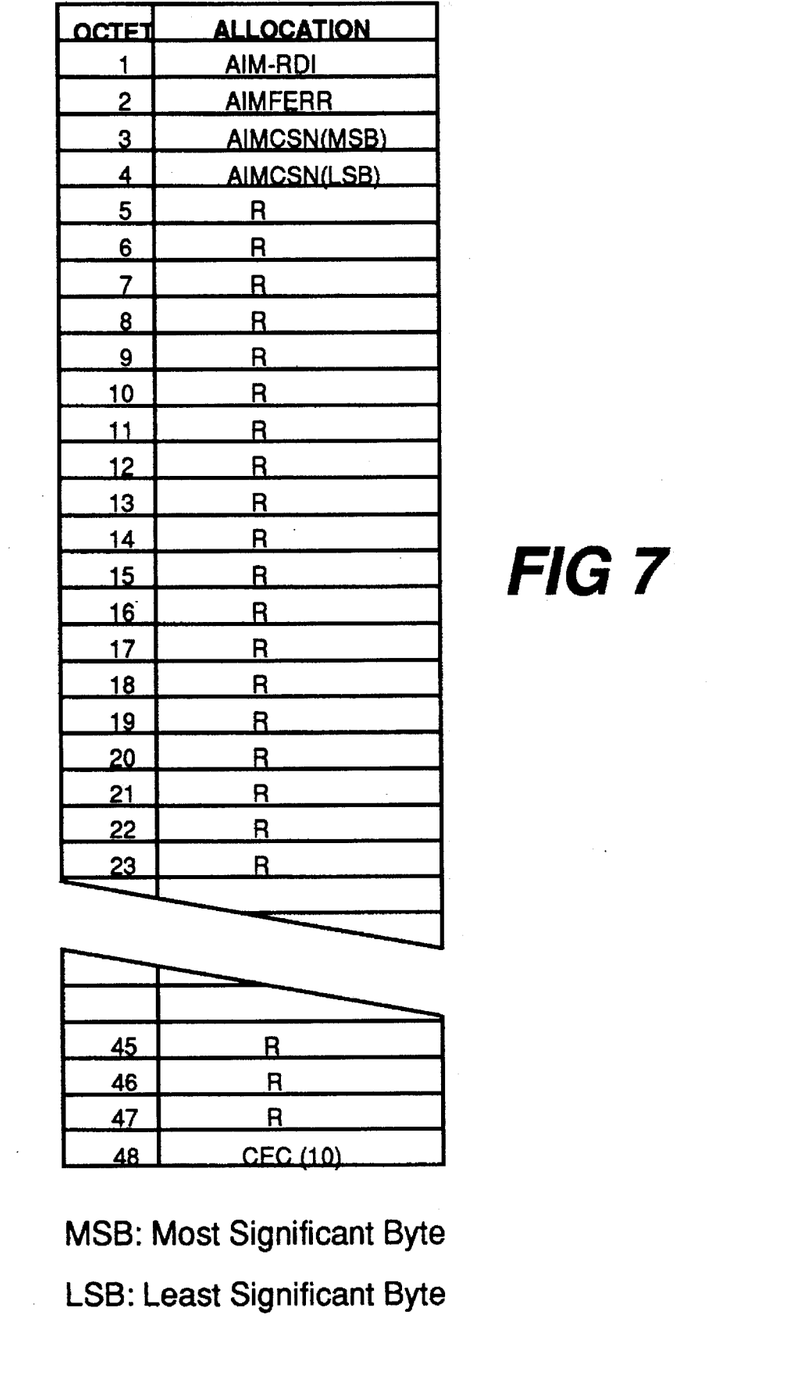
FIG. 7 indicates allocation of OAM functions in the information field according to one embodiment of the invention.

The AIM OAM cell payload is then available for exchanging information between AIMs. The cell payload consists of a series of fields whose locations are shown in FIG. 7.

The following fields are identified for the AIM protocol according to one embodiment of the invention:

ATM inverse multiplexing remote defect indicator (AIM-RDI)—one octet is allocated and the proposed coding is all "1".
ATM inverse multiplexing far-end receiver ready (AIM-FERR)—one octet is allocated and the proposed coding is all "1".
ATM inverse multiplexing cell sequence number (AIMCSN)—it is defined to contain the sequence number of the cells sent over the multiple links handled by the ATM inverse multiplexers. It is designed so as to have a sufficiently large cycle to allow the ATM inverse multiplexer to absorb link delays of up to 32 milliseconds. There are 16 bits allocated to the AIMCSN field. The counting is then done modulo 65536.
Cell error control (CEC)—is used to detect errors in the cell payload. It is proposed to CRC-10 as proposed in ITU Recommendation I.432.
Reserve field (R)—contains the octet pattern of "01101010", which is the same as that of the idle cell as proposed in ITU Recommendation I.361.

Figure 8:
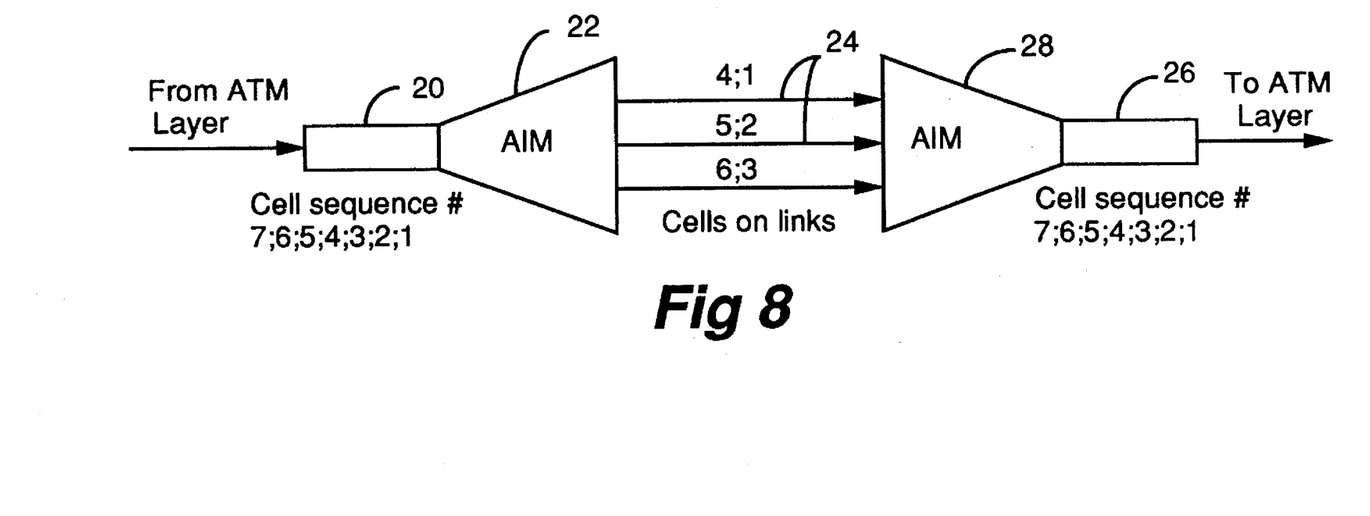
FIG. 8 is a schematic illustration of multiplexing and demultiplexing of AIM OAM cells according to one embodiment of the invention.

Referring to FIG. 8, the ATM inverse multiplexing protocol according to one embodiment is described in detail below. The figure only shows one direction for clarity. It is shown that transmission links are all T1/E1 links but, of course, links can have a different speed from T1/E1, as long as all the links have the same speed. A transmitting node 20 collects digital data consisting of a series of ATM data cells from the ATM layer. An ATM inverse multiplexer (AIM) at the transmitting node spreads over multiple links 24 for transmission to a receiving node 26. An AIM at the receiving node reassembles ATM data cells received from the links in proper order and sends them to the ATM layer.

Link Start-up

Upon connection start-up, AIMs at both nodes start inserting AIM OAM cells (AIM SN cells) carrying cell sequence number over the available links in round robin fashion. The sequencing of cells is based on the order in which cells have to be transmitted on the virtual link (composed of N physical links). However, the sequence number is only carried over the SN cells. This sequence number assignment allows the receiving AIM to retrieve the original cell sequence. The receiving node queues the received AIM SN cells until it determines the sequence in which to read the ATM data cells from the incoming links as well as the differential delay among individual links. Then, it starts sending AIM SN cells of its own, with the AIMFERR field set to "one" for each link which is now considered "ready" to receive ATM traffic. From that moment, the receiving node knows the sequence of cells coming from the links. A link is being considered available if cells are currently delineated and AIM-RDI is not received on the incoming link.

When the transmitting node starts sending the AIM SN cells, it starts a time-out of 100 milliseconds within which the receiving node determines the sequence of AIM SN cells which it is receiving from the links. The time-out expires unless the transmitting node receives the "ready" signal from all the links which were considered available at the initialization.

If there is no "ready" link when the time-out expires, the local node reevaluates the availability of the links (using cell delineation), starts sending AIM SN cells over the available links and re-starts the time-out. This procedure is repeated until at least one available link is declared ready.

When the time-out has been canceled due to the reception of the "ready" signal from all the available links, or when there is at least one link ready when the time-out expires, the local end starts sending ATM layer cells over the "ready" link or links using the same round robin order used at the time of initialization.

Figure 9:
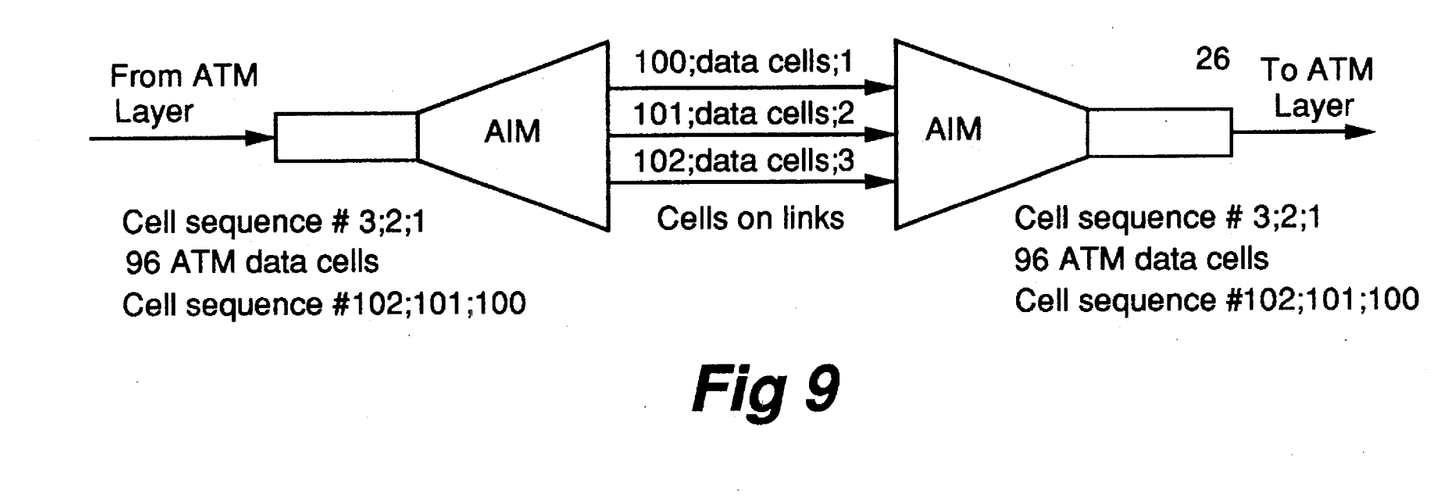
FIG. 9 is a schematic illustration of periodic multiplexing and demultiplexing of AIM OAM cells during transmission of ATM data cells according to one embodiment of the invention.

Each ATM layer cell gets a sequence number assigned to it, but only the AIM SN cells carry that number across the links. After both nodes have started sending ATM layer cells, they periodically send a series of "n" AIM SN cells over links to allow the receiving node to readjust the differential delays among the links. The value of "n" is equal to the number of "ready" links used to carry ATM layer cells. This means that the receiving node always scans for AIM SN cells in order to determine if it is always reading cells from the multiple links in the correct order. How often a burst of "n" AIM SN cells is sent depends upon the link utilization but the maximum period has been set to 50 milliseconds in one embodiment. An example of cells sent over a virtual link composed of a plurality of transmission links is shown in FIG. 9.

Link Reconfiguration

As mentioned above, the protocol according to the invention also deals with link reconfiguration. There are three possible cases in which reconfiguration can occur:

a new link has to be added to the round robin;
a link has to be intentionally removed from the round robin; and a link has been declared inadequate to provide service (e.g. link down by failure etc.).

In the first two cases, a node starts link reconfiguration by performing the same initialization process for a connection start-up, that is to say, it chooses a round robin order among the links and starts sending AIM SN cells using the chosen round robin order. The receiving node, seeing the occurrence of AIM SN cells, will stop transmitting traffic and starts sending AIM SN cells of its own while adjusting itself to receive traffic from the incoming links. The rest of the protocol is as described earlier for start-up.

Two possible cases for reporting failure conditions are:

1) A medium problem reported through Loss of Delineation (LCD) failure condition. In this case, the corresponding link should not be used for service. When detecting LCD, SN cells with AIMRDI set to "1" should be sent over the corresponding outgoing link. SN cells containing AIM-RDI do not carry a valid sequence number. At the far-end, the detection of AIM-RDI signals will indicate that the link is not to be used. Therefore, if LCD or AIM-RDI is detected, the link is no longer considered available and won't be allowed to be part of the round robin on both sides. When this has happens, SN cells are re-sent over the remaining links to re-establish the connection between the two ends.

2) Cells are lost without an LCD or AIM-RDI being reported. For instance, this would occur when a few cells are discarded by the physcial layer device due to bit errors in cell headers. This would cause the cell sequencing to be affected. One symptom would be the detection of SN cells whose number is no longer the same as that expected (since one or more of the previous cells are missing). In this case, the problem might be partially corrected by re-ajusting the receiver buffering system (assuming the difference between the SN cell number and the expected number is small). The other symptom would be the absence of a SN cell on one link when getting a burst of SN cells on all the other links. In that case, the local end would have to force the links to be re-configured. If the symptoms described above reoccur over a given period, the bad link may have to be removed from the round robin.

A link reconfiguration also occurs when it takes too much time for one link to receive cells from the far-end (receiving) node, that is to say, no cells within, e.g., 32 milliseconds.

Cell Sequence Number Range

Because an ATM inverse multiplexer must absorb a differential delay between individual links of up to 32 milliseconds in one embodiment, and because the system needs to deal with a maximum of 8 T1/E1 links, it is necessary to have a sequence number whose modulo is large enough to accommodate such delay.

As a practical example, the following parameters for E1 are considered:

full rates: 2.048 Mbit/s
payload rates: 30/32*2.048 Mbit/s=1.92 Mbps
ATM cell: 53 bytes
ATM cell period time: 221 microseconds
ATM cells/32 milliseconds=144 cells.

For a delay of up to 32 milliseconds on each link, there is a need to queue cells for at least the same length of time on each link. Therefore, in this example, this means that a delay of up to a period of 144 cells between two links is possible. An ATM inverse multiplexer can handle a maximum of 8 T1/E1 links. Therefore up to 1008 cells (144*7 cells) must be queued at one time by one ATM inverse multiplexer. This requires a sequence number modulo large enough to cover this scenario. A simple case in one embodiment is to use a 16-bit count that has modulo 65536.

The ATM inverse multiplexing protocol according to the invention realizes the following characteristics:

it is applicable to UNIs, BICIs and PNNIs (any applicable points in an ATM network);
it does not affect the ATM cell header of currently defined cells;
it does not require a change to current ATM physical layer devices dealing with the convergence of ATM cells into T1/E1;
it operates transparently to the ATM layer;
it does not require a change to current devices dealing with the processing of the ATM layer cell;
it is self-configuring among available links upon start-up and self-reconfiguring among the multiple links in the case when a new link has to be added, deleted or considered inadequate to provide service; and
it includes a sequence number whose modulo is large enough to meet the requirement of a large differential delay among the links.

What is claimed is:

1. A method of inverse multiplexing digital data from a source node to a destination node over a connection consisting of a plurality of transmission links, said data containing a series of ATM data cells, comprising steps of:

at a connection start-up, the source node sending to the destination node ATM sequence number cells informing the latter of a specific round robin order in which the series of ATM data cells are to be transmitted over the connection;

the destination node sending ATM sequence number cells whose receive ready field is set to indicate that the destination node is ready to receive ATM data cells in said specific round robin order from the plurality of transmission links; and the source node sending each ATM data cell in said series of ATM data cells to the destination node in said specific round robin order.

2. The method according to claim 1 wherein the step of the source node informing the destination node includes a step of the source node sending a series of ATM sequence number cells whose sequence number field is set in a sequential order, each ATM sequence number cell being sent over each transmission link in said specific round robin order.

3. The method according to claim 2 wherein the step of the destination node sending the source node includes a step of the destination node sending a series of ATM sequence number cells whose receive ready field is set and whose sequence number field is set in a sequential order, each ATM sequence number cell being sent over each transmission link in said specific round robin order.

4. The method according to claim 3 comprising a further step of the source node and destination node sending periodically to one another a series of ATM sequence number cells over the transmission links in the specific round robin order within a predefined time period.

5. The method according to claim 4 wherein said ATM sequence number cells are physical layer OAM cells whose protocol fields are properly set to indicate types of cells and said sequential order.

6. The method according to claim 5 wherein said ATM sequence number cells are physical layer OAM cells whose protocol fields contain a field to indicate the destination node is ready to receive ATM data cells.

7. The method according to claim 4 wherein the source node and destination node send periodically a burst of "n" sequence number cells to each other over "n" transmission links, within a predetermined maximum time period, where "n" is a positive integer.

8. The method according to claim 7 wherein the period of the source node and destination node sending a burst of "n" sequence number cells to each other over "n" transmission links is adjustable within the maximum time period, depending upon the link utilization.

9. A method of inverse multiplexing digital data from a node to another node over a connection consisting of a plurality of transmission links, said data containing a series of ATM data cells, comprising steps of:

whenever the connection is to be reconfigured, a first node of the two nodes sending to the other node ATM sequence number cells whose sequence number field is set to indicate a specific round robin order in which the series of ATM data cells are to be transmitted over the connection;

the other node, in response to the first node, sending ATM sequence number cells whose receive ready field is set to indicate the other node is ready to receive ATM data cells in said specific round robin order from the plurality of transmission links; and the first node sending each ATM data cell in said series of ATM data cells to the other node in said specific round robin order.

10. A method according to claim 9 comprising further steps of:

whenever the connection is to be reconfigured upon failure of a transmission link, one of the two nodes sending to the other node an indication that a link has failed; and the two nodes performing the steps recited in claim 9 over the remaining transmission links.

11. The method according to claim 9 wherein said ATM sequence number cells are physical layer OAM cells whose protocol fields are properly set to indicate types of cells and said sequential order.

12. The method according to claim 10 wherein said ATM sequence number cells are physical layer OAM cells whose protocol fields are properly set to indicate the link failure.

* * * * *

UNITED STATES PATENT OFFICE
CERTIFICATE OF CORRECTION

Patent No. 5,608,733      Dated  March 4, 1997

Inventor(s)  Richard Vallee et al.

It is certified that error appears in the above-identified patent and that said Letters Patent is hereby corrected as shown below:

On the title page:

please add "Assignee:  Northern Telecom Limited
                                       Montreal, Quebec, Canada"

Signed and Sealed this

Ninth Day of September, 1997

Attest:

BRUCE LEHMAN

Attesting Officer      Commissioner of Patents and Trademarks